UNITED STATES PATENT OFFICE.

HENRY DREYFUS, OF BASEL, SWITZERLAND.

PROCESS OF TREATING CELLULOSE ACETATES TO ALTER THE SOLUBILITIES THEREOF AND PRODUCTS OF SAID PROCESS.

1,217,722.       Specification of Letters Patent.     Patented Feb. 27, 1917.

No Drawing. Original application filed October 2, 1911, Serial No. 652,442. Divided and this application filed August 1, 1913. Serial No. 782,530.

*To all whom it may concern:*

Be it known that I, HENRY DREYFUS, a citizen of the Republic of Switzerland, residing at Basel, Switzerland, have invented certain new and useful Improvements in Processes of Treating Cellulose Acetates to Alter the Solubilities Thereof and Products of Said Processes, of which the following is a specification.

The object of the present invention is to provide a treatment of certain cellulose acetates, insoluble in chloroform, but soluble in alcohol-chloroform and in alcohol-tetrachlorethane, and soluble in concentrated or somewhat diluted acetone, said acetates having been obtained by a direct acetylation process without passing through a chloroform-soluble stage, whereby to produce cellulose acetates having certain other desired solubilities, which products are capable of use in the manufacture of films, threads, varnishes and plastic bodies of all kinds.

I have discovered that by treating the aforesaid cellulose acetates which are insoluble in chloroform, but which become very soluble, on the addition of more or less alcohol to the chloroform, and which are soluble in concentrated acetone, or are soluble in acetone containing a small percentage of water, with either organic or inorganic acids, or acid salts, or mixtures of these, and preferably by allowing the reaction to continue for a considerable time in the original acetylizing solution or any equivalent solution, with or without the addition of water, acids, or other agents which have the same effect in destroying the acetylizing action of the acetic anhydrid without preventing a further reaction for the formation of the successive solubilities in various solvents, and by then interrupting the action at the time when these different desired solubilities have been produced, and before the same disappear, a series of valuable products can be obtained.

These products, obtained by interrupting the action at successive stages thereof, are distinguished from each other, and from the cellulose acetates forming the starting material of the process, and from all cellulose acetates heretofore known, by their solubilities in any one of several solvents singly, or in mixtures thereof.

The acetates treated may be (and the process is particularly adapted for the treatment of) the products produced in accordance with the process described in my copending application, Serial No. 652,442 (now U. S. Patent #1,181,857), of which the present case is a division or by the direct acetylation processes described in my French Patents 432,046 and 478,023. The products of said parent application are particularly distinguished in that while they are insoluble in chloroform, or in tetrachlorethane alone, they are readily soluble by the addition of alcohol to these chlorinated hydrocarbons, and are readily soluble in a concentrated acetone, or else in acetone containing a relatively small percentage of water. The products produced in accordance with my present invention are distinguished from the cellulose acetates heretofore technically known, in that they give solutions in acetone, which are more viscous than any heretofore produced, so that such solutions can be used for making films and for making celluloid substitutes, as substitutes for nitro-cellulose, having all the properties required for making good films and good celluloid substitutes. The solutions in acetone are highly viscous, clear, very concentrated, while the hitherto produced products give solutions in acetone, of which the viscosity varies from that of water only up to that of a syrup. The cellulose acetates heretofore produced in most cases do not give good films, but give films which are brittle, or give powdery masses only. Furthermore the products obtained in carrying out the process by treating the precipitated cellulose acetates with dilute acid, such as sulfuric acid, are more or less soluble in dilute alcohol when cold, which solutions spread out on glass plates give transparent films, which when dried are not brittle but are elastic and can be folded a considerable number of times at the same point without breaking, while by a similar treatment of cellulose acetates soluble in chloroform and made by direct acetylization, dissolving in alcohol, spreading out and drying products are produced which are opaque to whitish masses or fragments of films, which are very brittle.

Another important feature of the present invention is that the original cellulose employed need not be a dry cellulose, as in Patent No. 838,350, but on the contrary is preferably a cellulose containing a normal percentage of moisture, for example about 5%, as described in my copending application No. 652,442, (now Patent No. 1,181,857) or my French Patents 478,023 or 432,046.

The cellulose acetates, insoluble in chloroform, but soluble in chloroform-alcohol may be treated as follows:—

The reaction is preferably allowed to go on, while the acetates are still in the original acetylizing solution (after adding any substance capable of preventing further acetylizing action, but incapable of preventing the desired changes in the solubility). Also the cellulose acetates being treated may be dissolved in an equivalent solution, to produce a solution of the specified cellulose acetates containing organic or inorganic acids, or acid salts or mixtures thereof, and also if necessary with the addition of agents which are capable of preventing further acetylization of the cellulose acetates, without preventing the further reaction for the formation of the successive solubilities herein described. This action is allowed to proceed, until the treatment of test portions shows that the desired solubilities exist. By this treatment, and by interrupting the same at the time when the desired solubilities exist, a series of new acetylated derivatives of cellulose can be obtained, which derivatives can be distinguished from each other and from the starting material and from other cellulose acetates, by their solubilities in one or in several solvents or in mixtures of certain solvents. Also the solubility of these products in each of the different solvents and mixtures of solvents, is progressively modified as the duration of the reaction is prolonged.

During the reaction, the products become (in addition to the existing solubility in acetone) progressively more easily soluble in chloroform-alcohol, and simultaneously solubilities in diluted alcohol and in alcohol-benzene are developed. On continuing the reaction, the solubility in alcohol-benzene again decreases and disappears, while the solubilities in diluted alcohol and in acetone still continue. This may be demonstrated, by testing samples at successive stages of this second reaction. Later on, the solubility in pure acetone, or in any acetone solution containing over 80% of pure acetone, successively decreases and finally disappears, while a solubility in diluted acetone is successively more and more developed, so that the longer the duration of the process, the larger the amount of water that must be added to the acetone, in order to dissolve the product; until finally a product soluble in hot water, or in aqueous solutions is obtained. Besides these solubilities from the beginning the solubility in alcohol-tetrachlorethane, and in certain other solvents progressively increases, throughout the time of the second reaction. Also the relative proportions of the constituent parts of mixtures of solvents such as alcohol and chloroform, in the mixture which will most readily dissolve the product will progressively change. During the stage in which the product is soluble in alcohol-benzene, the products are very soluble in hot diluted alcohol (up to 70 to 80% or even more) and are of great importance.

These products if submitted to the said treatment while in a precipitated form will produce very concentrated solutions of cellulose esters in dilute alcohol, which on cooling will give completely transparent masses. Such a solution in hot 75% alcohol, spread out on a glass surface congeals almost immediately and after drying gives a film of most excellent quality which is very pliable, and may be folded many times at the same point without breaking.

These same products give transparent, viscous solutions in hot alcohol-benzene, which on cooling, set and form coherent and completely transparent masses, and if these hot solutions are run onto a glass plate, films are produced which are of a remarkable quality (being transparent, instead of whitish and powdery masses).

The principle of the present process is also to interrupt the reaction in any one of the different phases of solubilities, in order to change progressively with the duration of the reaction, the solubilities in the different solvents or in mixtures thereof.

Also the use of a cellulose acetate of the kind herein described, which is insoluble in chloroform, gives the great final advantage, that the resulting products give much more viscous solutions than those obtainable from any cellulose acetate which is soluble in chloroform.

I have moreover found that in carrying out this "second reaction" in the original acetylizing solution, or in similar solutions, the formation of these products soluble in the various solvents or mixtures thereof can be accelerated or made slower by changing one or more of the conditions such as by raising the temperature of the original acetylizing solution, or by increasing the amount of water, mineral acids or other acids, or acid salts, or mixtures thereof.

By prolonging the action of the original acetylizing solution, (as left when a product insoluble in chloroform has been produced, with or without the addition of water or other suitable substances thereto) I can convert either the aforesaid cellulose acetates insoluble in chloroform into cellulose acetates soluble therein (said products not being the chloroform-soluble products made by a direct acetylation process, but by the secondary process herein described, and which products are different in their behavior with other solvents than those chloroform-soluble products heretofore known and made by a direct acetylation process) or the reaction in the present process can be carried out also in a different manner in such a way that the products remain always insoluble in chloroform while the solubilities in other solvents will progressively change. If water is added to the original acetylization of the cellulose acetate (that is to say, the solution in the original acetylation mixture) the amount of added water should preferably not be more than 30 to 35%, and in many cases much less water, say up to 5 to 10% or up to 20% is sufficient. Water may be omitted entirely if so desired or replaced by alcohol, or by other substances having a similar effect. The products produced according to my process, which while being soluble in acetone and particularly those products which are simultaneously soluble in acetone, alcohol-benzene, chloroform, and chloroform-alcohol, etc., cannot be produced when using a quantity of water over about 30 to 35%, or eventually products which are simultaneously soluble in all the aforesaid solvents with the exception of chloroform, (in which they are insoluble) cannot be produced when using a quantity of water materially greater than 35%, but are produced by certain modifications of my process, as described below.

Even when using 30 to about 35 parts of water this amount is too much in my process for producing the especially important solubilities above referred to, which are produced only when using smaller quantities of water.

In my process, I operate upon a cellulose acetate which is insoluble in chloroform, and I have found that good results can be obtained with quantities of water of less than about 30 to 35%, (especially when using about 20 to 30% or 5 to 20%) (based upon the amount of cellulose employed giving good results), especially when using a cellulose acetate produced when employing about 250 parts of acetic anhydrid and 10 to 15 parts of sulfuric acid, per 100 parts of cellulose.

If instead of using sulfuric acid, the further reaction is effected by using weaker acids (such as organic acids) or other similarly acting agents, or if the quantity of sulfuric acid is diminished more and more, these proportions may be varied between certain restricted limits, the smaller the amount of sulfuric acid the larger the amount of water or its equivalent. Consequently if only organic acid is present, a larger amount of water can be used. All these products show different behavior, according to whether they have been produced with larger or smaller amounts of water or other similarly acting materials, (which effect is independent of the difference in solubilities produced by prolonging the said secondary reaction). It may also be stated that in my process it is not necessary to add any water or acids but products of varying solubilities may be produced by allowing the acetylizing reaction to proceed without adding anything to the solution, and interrupting the reaction when the different desired solubilities exist. In this latter case the resulting products are especially of interest when the original acetylizing reaction has been effected with relatively small quantities of acetic anhydrid, so that no free anhydrid is present after the completion of the acetylizing reaction. In this mode of procedure the reaction can be interrupted, by the addition of alcohol, and substances having a similar effect.

If the amount of acetic anhydrid is increased, the amount of water to be added may be increased in corresponding molecular proportion depending upon the amount of moisture in the original cellulose or other material employed.

In place of water, other agents may be used which are capable of neutralizing (so far as acetylization is concerned) the acetic anhydrid, but which will not act to prevent the formation of the desired changes in solubility. Such bodies as hydroxyl derivatives, oxyacids, alcohols, etc., may be used, but such substances possess no advantages over water, and are more expensive, and are accordingly not to be generally recommended.

In this manner products may be produced which are soluble in acetone, soluble in alcohol-benzene, in alcohol-chloroform, and in chloroform simultaneously, and which by further prolonging the reaction lose their solubility in chloroform while retaining for a time the other solubilities mentioned, or products can be directly produced without passing through a stage of being soluble in chloroform, which are soluble in acetone, soluble in alcohol-benzene, and in alcohol-chloroform, but insoluble in chloroform. Such products are of great value.

If on the other hand more water is used, while still observing the proportions of 2½ to 1 then the reaction can be carried out in a different manner, depending upon the increase of the amount of water or its equivalent, over that above stated, whereby products can be directly produced which have other solubilities but which are insoluble in acetone.

Products soluble only in dilute acetone but insoluble in alcohol-benzene, soluble in alcohol-chloroform, and insoluble in chloroform may thus be prepared, or products soluble in dilute acetone, insoluble in chloroform, insoluble in alcohol-benzene, and even insoluble in alcohol-chloroform may be produced.

The reaction can be accelerated by raising the temperature, or by increasing the quantity of mineral acids if used. Thus if sulfuric acid is used as the mineral acid, (instead of for example organic acids alone) in the original acetylization, in amount equal to 10 to 25%, a more rapid reaction will take place than would be the case if only about 3% of sulfuric acid were used, (the other conditions being the same).

The length of time necessary for the reaction to produce the desired solubilities, will vary according to the conditions, and may amount to a few hours only, or it may be 10 to 20 hours, or from 2 to 4 days, or even much more, depending upon the different conditions. In this way, it is possible to isolate products having the finest difference of solubilities.

The preparation of those cellulose acetates to be employed in the present process and which are insoluble in chloroform, (as starting materials for the present process) is preferably effected in accordance with the directions given in my copending application 652,442, or according to my French Patents Nos. 432,046, and 478,023 and these products can be prepared either in solution or in suspension. Generally, all cellulose acetates, which are insoluble in chloroform, but which are soluble in alcohol-chloroform, and which have been produced by a direct acetylation process without passing through a stage of being soluble in chloroform, during this acetylation process, can be used, either in the original acetylizing solution, or in precipitated form, or suspension.

In order to illustrate my invention I give the following example, the parts being by weight, but it is to be noted that the invention is not limited to this example, which is given for the purpose of illustration only, for making the invention clear.

*Example.*

A solution of cellulose acetate, as directly produced, for example by treating 100 parts of cellulose, 400 parts of glacial acetic acid, and about 250 parts of acetic anhydrid, and 10 to 15 parts of sulfuric acid, by directly introducing the cellulosic material containing about 5 to 6% of moisture, as in my parent application, into this acetylizing mixture, at a relatively low temperature or by progressively introducing the acetic anhydrid into the mixture of the acetic acid, sulfuric acid and cellulose, according to French Patents No. 432,046 or 478,023, or any other solution of a cellulose acetate which is insoluble in chloroform and which has been produced by a direct acetylation process containing organic or inorganic acids or acid salts or mixtures thereof, is allowed to stand at about ordinary temperature, until a test portion indicated the existence of the desired solubilities, whereupon the acetate is precipitated, washed and dried.

If in this example the amount of water used is equal to about 5 to 10%, or even up to 20% of the weight of the cellulose employed, and if the mixture is allowed to stand at a temperature of about 20° C., the following changes in solubility may be observed. The original material being insoluble in chloroform, but soluble in concentrated acetone, or else soluble in a somewhat diluated acetone, becomes soluble in chloroform, and the reaction can then be interrupted.

After about 20 hours, besides the existing solubility in acetone, and chloroform a solubility in alcohol-benzene, and in diluted alcohol, and in ethyl acetate is developed to a high degree. After about 40 hours these solubilities are very great. The reaction can also be directed in such a manner that the solubility in chloroform never appears, as described below.

The reaction in the original acetylizing solution can also be carried out in the following manner, by the addition of sufficient water to destroy the acetylizing effect of the acetic anhydrid, and allowing the mixture to stand until test portions indicate the desired solubilities. In this process one may employ an amount of water equal to 5 or 10%, or up to 20%, of the weight of cellulose employed. If more than about 30% to 35% of water is used, while the amount of sulfuric acid remains the same, then a product soluble in chloroform, will not be produced, but the product is insoluble in chloroform, although it will be soluble in certain other solvents, as above noted, for example in chloroform-alcohol, alcohol-benzene, concentrated acetone, dilute alcohol, etc. If 40%, or more of water is employed, (based upon the weight of the cellulose employed) one can obtain directly a product having a solubility in diluted acetone, which does not have the solubility in alcohol-benzene or some of the other solubilities above stated, irrespective of how long the reaction is continued.

By diminishing the quantity of sulfuric acid present by the addition of neutralizing agents, after the acetylization is completed, or by using less sulfuric acid in the acetylizing reaction, the reaction is retarded, which effect is also produced by using only organic acids, but then this retarding can be balanced by a raising of the temperature, moreover the quantity of water can in these latter cases also be increased.

These products are used for the manufacture of artificial silk, artificial horse-hair, celuloid, films, artificial leather, insulating devices, varnishes, coatings and various other purposes.

The treatment of precipitated cellulose acetates to change their solubilities is not specifically claimed herein, but in my copending application 73,496, filed Jan. 21, 1916.

What I claim is:—

1. A process of treating a cellulose acetate which is insoluble in chloroform and in diluted alcohol, but soluble in acetone, which comprises subjecting such a cellulose acetate, while the same is in solution in the presence of an acid material, to the continued action of such acid material until a product is obtained which is soluble in diluted alcohol of a predetermined concentration, and then stopping the reaction before said solubility disappears.

2. The process of treating a cellulose acetate insoluble in chloroform and in alcohol of a predetermined concentration and in alcohol-benzene, which comprises treating the same with a solution containing acid-forming ions, until a cellulose acetate soluble in a liquid comprising alcohol of said predetermined concentration and soluble in alcohol-benzene, is produced, and then stopping the reaction, before said solubilities disappear.

3. The process of treating a cellulose acetate insoluble in chloroform and insoluble in alcohol-benzene, but soluble in acetone which comprises treating the same with a dilute acid until a cellulose acetate soluble in alcohol-benzene is produced and then stopping said reaction before said solubilities disappear.

4. The process of treating a cellulose acetate insoluble in chloroform and in alcohol-benzene, but soluble in acetone, which comprises treating the same with dilute mineral acid until a cellulose acetate soluble in acetone, and in alcohol-benzene, is produced as determined by tests at successive stages of the process, and stopping the reaction before said solubilities disappear.

5. The process of treating cellulose acetates insoluble in chloroform and in diluted alcohol, but soluble in acetone and in alcohol-chloroform, which comprises treating the same with an acid until the cellulose acetates become soluble in diluted acetone, and in diluted alcohol.

6. A cellulose acetate soluble in acetone, giving therein highly viscous solutions and soluble in alcohol-benzene, and soluble in diluted alcohol, and soluble in alcohol-chloroform.

7. A cellulose acetate soluble in acetone, giving therein highly viscous solutions, and soluble in alcohol-benzene, and soluble in diluted alcohol, and soluble in alcohol-chloroform, and soluble in chloroform.

8. A process of converting cellulose acetates insoluble in chloroform but soluble in acetone into products having certain desired solubililties, which comprises treating said cellulose acetates with a solution containing an acid, said solution containing less than 35 parts of water to each 100 parts of cellulose represented by the cellulose acetate employed.

9. A process of treating a cellulose acetate which is insoluble in chloroform but soluble in acetone, which comprises subjecting the same, while in solution, to the action of an acid material having no acetylating action.

10. A process of treating a cellulose acetate, which is insoluble in chloroform, but soluble in acetone and in alcohol-chloroform by subjecting the same while in solution to the action of an acid material having no acetylating action, in the presence of water.

11. A process of treating a cellulose acetate which is insoluble in chloroform and insoluble in alcohol-benzene but soluble in acetone, by subjecting the same, while in solution, to the action of an acid material having no acetylating action.

12. A process of treating a cellulose acetate, which is insoluble in chloroform but soluble in a mixture of acetone and water, by subjecting the same while in solution, in the presence of water, to the action of an acid material which has no acetylating action, whereby the amount of water present has an effect upon the solubilities developed by said treatment.

13. A process of treating a cellulose acetate, which is insoluble in chloroform, but soluble in acetone by subjecting the same, while in solution in a solvent having no acetylating action to the action of an acid material in the presence of water, whereby the quantity of water determines the solubilities developed.

14. A process of treating a cellulose acetate which is insoluble in chloroform but soluble in acetone, which comprises subjecting the same while in solution in the presence of an acid solvent having no acetylating action, and in the presence of water, until a product soluble in chloroform and soluble in acetone has been obtained and then stopping the reaction while these solubilities exist.

15. A process of treating a cellulose acetate which is insoluble in chloroform, but soluble in diluted acetone, which comprises subjecting the same, while in solution, to the action of an acid material having no acetylating action, until a product having different solubilities from the starting material has been produced.

16. A process of producing cellulose acetates having particular solubilities, being insoluble in chloroform, which comprises hydrating cellulose, thereafter acetylizing the same at a relatively low temperature, and thereafter subjecting the same, while in solution, to the action of an acid material free from acetylizing action, but capable of changing the solubility of the cellulose acetate.

17. A process of producing cellulose acetates having certain desired solubilities, being insoluble in chloroform, which comprises (1) hydrating cellulose by treating the same with a material containing sulfuric and glacial acetic acids, thereafter (2) reacting upon said hydrated cellulose, with an acetylizing agent at a relatively low temperature, to produce a cellulose acetate readily soluble in alcohol-chloroform, but insoluble in chloroform alone and thereafter (3) adding to the solution of the cellulose acetate in the acetylizing solution, an agent capable of destroying the acetylizing action of said acetylizing solution, and (4) allowing a secondary reaction to proceed, until the solubilities of the cellulose acetate have been changed.

18. A process of treating a cellulose acetate insoluble in chloroform, but soluble in chloroform-alcohol, which comprises treating the same in solution, with an acid, until a cellulose acetate simultaneously soluble in alcohol-chloroform, acetone, chloroform, alcohol-benzene and dilute alcohol is produced.

Basle, the 19th of July, 1913.

In testimony whereof, I have hereunto subscribed my name.

DR. HENRY DREYFUS.

Witnesses:
　PHILIP HOLLAND,
　ARNOLD ZUBER,
　EMIL DREYFUS.